April 3, 1945. C. O. MESSING 2,372,908
TRACTOR OPERATED RAKE AND STACKER
Filed Sept. 27, 1944 2 Sheets-Sheet 1
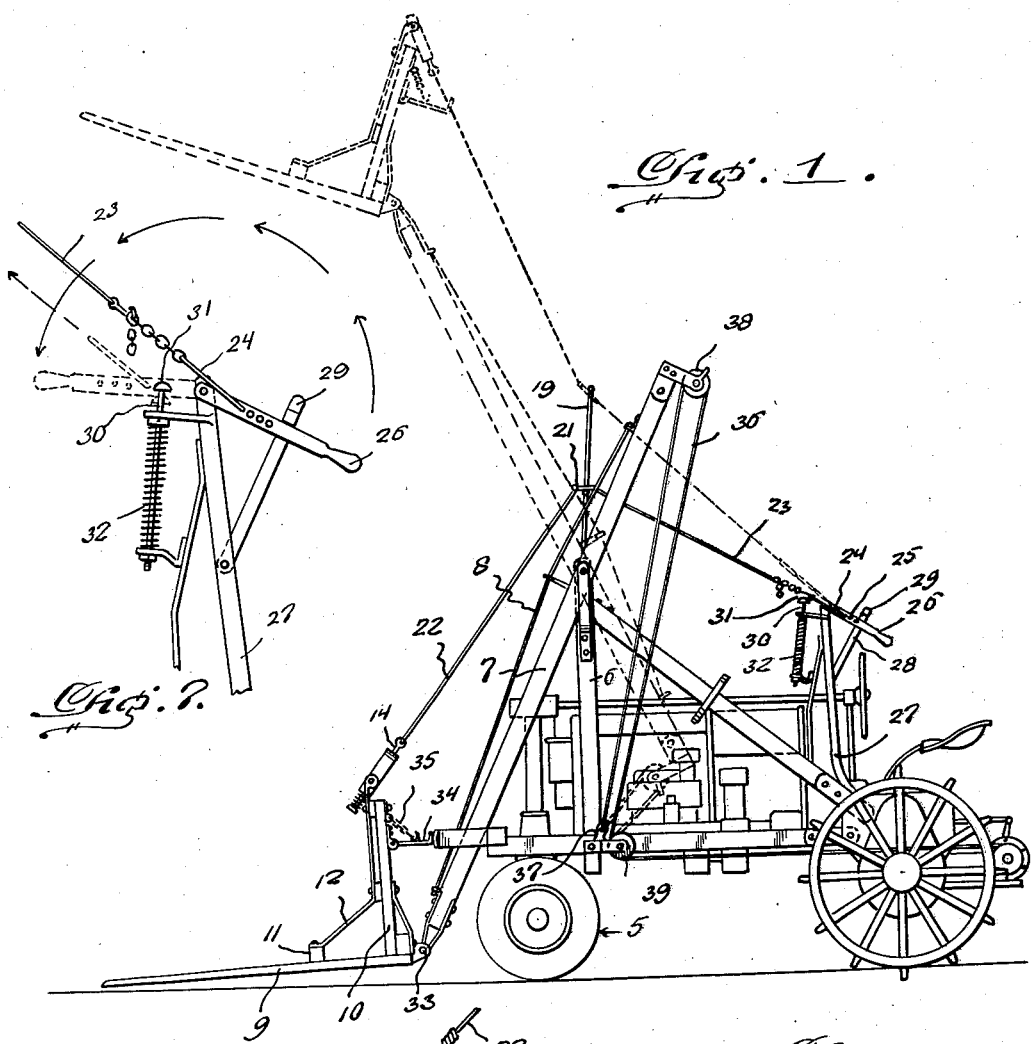
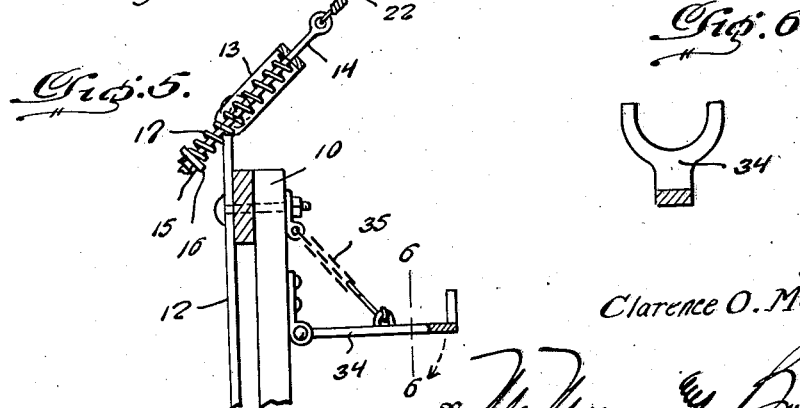
Inventor
Clarence O. Messing, April 3, 1945.  C. O. MESSING  2,372,908
TRACTOR OPERATED RAKE AND STACKER
Filed Sept. 27, 1944  2 Sheets-Sheet 2
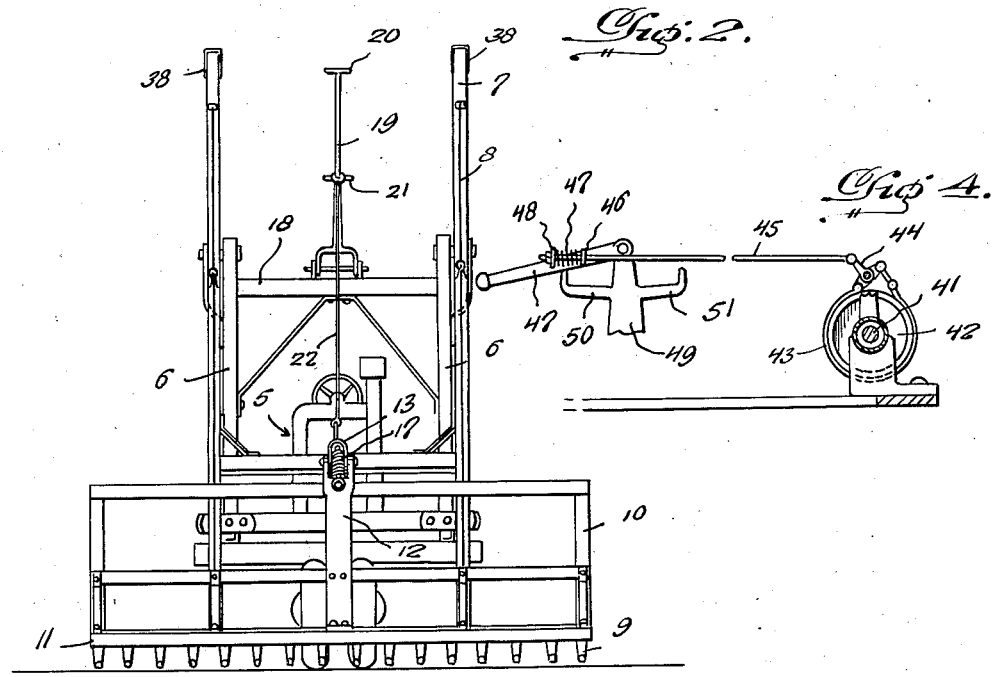
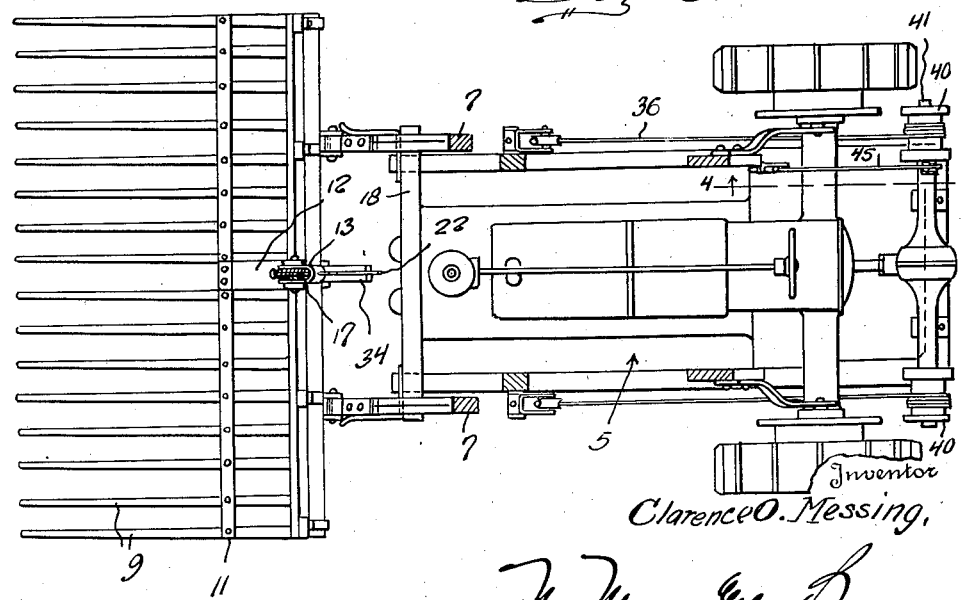

Patented Apr. 3, 1945

2,372,908

UNITED STATES PATENT OFFICE 2,372,908

TRACTOR OPERATED RAKE AND STACKER

Clarence O. Messing, Gilead, Nebr.

Application September 27, 1944, Serial No. 556,075

1 Claim. (Cl. 214—140)

This invention relates to new and useful improvements in farm rakes, the principal object being to provide a tractor operated rake which will not only serve as a buck rake, but also as a stacker.

Another important object of the invention is to provide a rake attachment for tractors which will be safe to operate and positive acting and foolproof at all times.

Another important object of the invention is to provide a rake attachment which also incorporates means whereby the rake is employed as a stacker, thus conserving considerable time and labor, inasmuch as hay can be collected directly from a windrow, moved to a collection point and then placed upon a stack.

Other objects and advantages of the invention shall become apparent to the reader of the following description.

In the drawings:

Figure 1 is a side elevational view showing the bull rake in raking position in full lines and in broken lines the rake in stacking position.

Figure 2 is a front elevation of the apparatus.

Figure 3 is a horizontal sectional view through the apparatus.

Figure 4 is a section taken substantially on line 4—4 of Figure 3.

Figure 5 is a fragmentary sectional view showing the rake clevis and cushioning means.

Figure 6 is a section on line 6—6 of Figure 5.

Figure 7 is a fragmentary side elevation of the control lever and shock absorber.

Referring to the drawings wherein like numerals designate like parts, it can be seen that numeral 5 generally refers to a conventional tractor which has a pair of uprights 6 mounted thereon and pivotally supporting a pair of beams 7, 7, these being provided with brace rods 8.

Numeral 9 denotes a buck rake having a back wall structure 10. A cross member 11 on the rake 9 has a strap 12 extending backwardly and upwardly along the front side of the wall 10 to brace the same and at the upper end of this strap 12 is a pivotal clevis 13 through which a pin 14 is slidable. The forward end of the pin has a nut and washer 15, 16 and between the washer and the clevis 13 and located on the pin 14 is a coiled compression spring 17.

Between the uprights 6, 6 is a bridge member 18 rising from this bridge member 18 is a swingable stem 19 having a head 20 at its upper end. A ring 21 is vertically slidable on the stem 19 and, of course, the stem 19 is rockable due to its pivotal connection to the bridge member 18. The ring 21 is connected by a cable 22 to the pin 14 (see Figures 1 and 5) and is also connected by way of a cable 23 to a hook 24 engageable with a selected opening 25 in a pivotal lever 26, which lever is pivoted to the upper end of a supporting bar 27. An arm 28 extends obliquely from the upper portion of the supporting bar 27 and has a boss 29 under which the lever 26 can engage. A rod 30 having a head 31 and supported by a spring 32 acts as a shock absorber when the lever 26 is released from under the boss 29 and swings, under the weight of the rake and the load thereon (when in elevated position).

It will be observed that the forward ends of the beams 7 are pivotally connected, as at 33, to the rear portions of the rake 9 and that the rake 9 is held in proper position by the cables 22, 23 in its movement upwardly when being elevated to hay stacking position. A pivoted bifurcated plate 34, supported by a chain 35, acts as a guide for the cable 22 when the rake is in elevated position, as shown in broken lines in Figure 1.

In order to elevate the rake, an elongated cable 36 is anchored, as at 37, and extends upwardly and over a pulley 38, one of these cables and pulleys being located at each side of the tractor and for each beam 7. The cable 36 extends downwardly to pass under a corresponding pulley 39 and from there rearwardly to a corresponding drum 40 on a power shaft 41. The power shaft 41 or one of the drums 40 is provided with a brake drum 42 around which is disposed a contractible band 43 operated by a lever 44. Extending forwardly from the lever 44 is a rod 45 extending through a swiveled lug 46 on a hand lever 47. A coiled compression spring 47' is interposed between the lug 46 and a stop 48 on the adjacent end of the rod 45. The hand lever 47 is mounted on a post 49 and on this post are arms 50, 51 for limiting the downward movement of the hand lever 47.

Obviously, by pushing the hand lever 47 forwardly, the rake band 43 holds the shaft 41 against movement. Swung to the opposite or rearward position, the lever 47 releases the brake band 43 so that the beams 7 can be raised or lowered. Further, this brake acts as a clutch so that the brake can be clutched when it reaches an elevated position, at which point it is desired to unload the rake when the proper height has been reached.

In order to dump the rake, the hand lever 26 is disengaged from the boss 29 and thrown upwardly. The lever 26 will strike against the head 31 of the pin 30 and the shock will be absorbed by the spring 32, as the length of the cable 23 is increased, permitting the stem 19 to move forwardly and the rake 9 to swing downwardly on the pivot point 33.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

A raking apparatus comprising a vehicle, a swingable beam structure, a bull rake pivotally secured to the beam structure, a power shaft, a winch on the power shaft, a cable extending from the winch to the beam structure for raising and lowering the beam structure and rake, a yieldable member, a cable extending from the rake to the yieldable member, a second cable extending from the yieldable member to a control point on the vehicle, a pivotal hand lever, an off pivot point connection between the last mentioned cable and the lever, detent means for the lever, said yieldable member consisting of a pivotal stem, a head on the stem, and a ring on the stem freely ridable on the stem and to which the cables are connected.

CLARENCE O. MESSING.